US008164053B2

(12) United States Patent
Sugiyama et al.

(10) Patent No.: US 8,164,053 B2

(45) Date of Patent: Apr. 24, 2012

(54) MASS ANALYZER AND MASS ANALYZING METHOD

(75) Inventors: Masuyuki Sugiyama, Hachioji (JP); Yuichiro Hashimoto, Tachikawa (JP); Hideki Hasegawa, Tachikawa (JP); Yasuaki Takada, Kiyose (JP)

(73) Assignee: Hitachi, Ltd., Tokyo (JP)

( * ) Notice: Subject to any disclaimer, the term of this patent is extended or adjusted under 35 U.S.C. 154(b) by 324 days.

(21) Appl. No.: 12/039,306

(22) Filed: Feb. 28, 2008

(65) Prior Publication Data

US 2009/0032697 A1 Feb. 5, 2009

(30) Foreign Application Priority Data

Aug. 1, 2007 (JP) ................................ 2007-200298

(51) Int. Cl.
*B01D 59/44* (2006.01)

(52) U.S. Cl. ......................... 250/282; 250/281; 250/290

(58) Field of Classification Search ................... 250/282
See application file for complete search history.

(56) References Cited

U.S. PATENT DOCUMENTS 4,329,582 A * 5/1982 French et al. ................. 250/292
5,179,278 A 1/1993 Douglas
5,420,425 A 5/1995 Bier et al.
5,464,985 A 11/1995 Cornish
5,679,950 A 10/1997 Baba et al.
5,696,376 A * 12/1997 Doroshenko et al. ......... 250/292
5,783,824 A * 7/1998 Baba et al. .................... 250/281
5,847,386 A 12/1998 Thomson et al.
6,111,250 A 8/2000 Thomson et al.
6,403,955 B1 6/2002 Senko
6,504,148 B1 1/2003 Hager
6,545,268 B1 4/2003 Verentchikov et al.
6,852,972 B2 2/2005 Baba et al.
7,019,289 B2 3/2006 Wang (Continued)

FOREIGN PATENT DOCUMENTS

WO WO 2006/008537 1/2006

OTHER PUBLICATIONS

"High Sensitivity Collisionally-activated Decomposition Tandem Mass Spectrometry on a Novel Quadrupole/Orthogonal-acceleration Time-of-fligh Mass Spectrometer" by Morris et al. 1996.

(Continued)

*Primary Examiner* — Phillip A Johnston
(74) *Attorney, Agent, or Firm* — Brundidge & Stanger, P.C.

(57) ABSTRACT

There has been a problem that both detection sensitivity and throughput cannot be improved simultaneously by a conventional MS/MS analysis method.

A mass analyzer having an ion trap for ejecting ions in a specific mass range, a collisional dissociation part for causing ions ejected from the ion trap to be dissociated, a mass analyzing part for performing a mass analysis of ions ejected from the collisional dissociation part, and a control part including a list in which measurement conditions for each ion are stored selectively resonance-ejects ions introduced into and accumulated in the ion trap based on masses. A scanning operation is a repetition of an operation of ejecting specific precursor ions in a direction of the collisional dissociation part and an operation of ejecting nothing, and each ion can be measured under optimal measurement conditions by controlling an output voltage of each part with reference to list information, realizing a mass analyzer that can perform an MS/MS measurement with high throughput and high sensitivity.

17 Claims, 8 Drawing Sheets

U.S. PATENT DOCUMENTS

| | | | | |
|---|---|---|---|---|
| 7,067,802 | B1 | 6/2006 | Kovtoun | |
| 7,078,685 | B2 | 7/2006 | Takada | |
| 7,329,866 | B2 | 2/2008 | Wang | |
| 7,476,854 | B2 * | 1/2009 | Syage et al. | 250/293 |
| 2005/0067564 | A1 | 3/2005 | Douglas et al. | |
| 2005/0194543 | A1 * | 9/2005 | Hieke | 250/400 |
| 2005/0253064 | A1 | 11/2005 | Loboda et al. | |
| 2005/0269504 | A1 | 12/2005 | Hashimoto et al. | |
| 2007/0164213 | A1 | 7/2007 | Javahery et al. | |
| 2008/0191130 | A1 | 8/2008 | Bateman et al. | |
| 2009/0014637 | A1 | 1/2009 | Giles et al. | |
| 2009/0114810 | A1 | 5/2009 | Green | |

OTHER PUBLICATIONS

"Sequence Analysis of Polypeptides by Collision Activated Dissociation on a Triple Quadrupole Mass Spectrometer" by Hunt, et al. 1981.

* cited by examiner

FIG. 8A
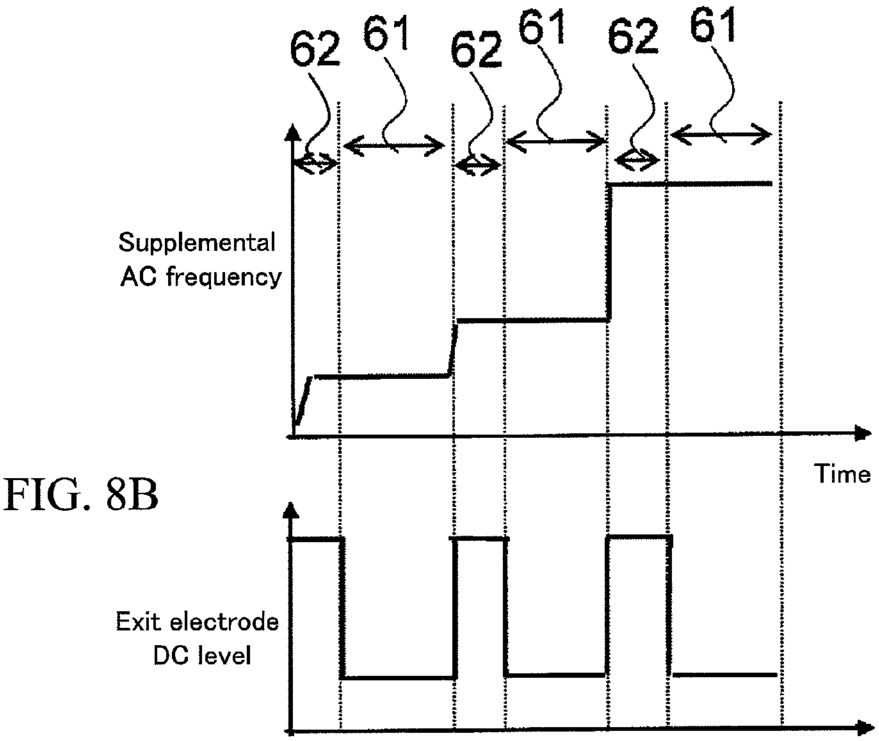
FIG. 8B
FIG. 9
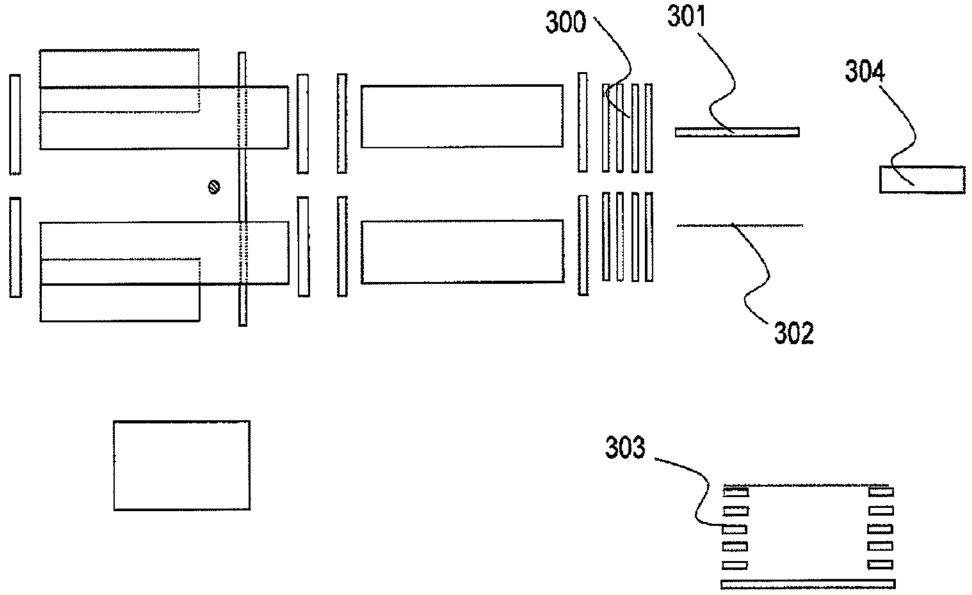

MASS ANALYZER AND MASS ANALYZING METHOD

CROSS REFERENCE TO RELATED APPLICATION

U.S. patent application Ser. No. 11/745516 is co-pending application of this application. The contents of which are herein by cross-reference.

CLAIM OF PRIORITY

The present application claims priority from Japanese application JP 2007-200298 filed on Aug. 1, 2007, the content of which is hereby incorporated by reference into this application.

BACKGROUND OF THE INVENTION

1. Field of the Invention

The present invention relates to a mass analyzer using an ion trap and an operation method thereof.

2. Description of the Related Art

MS/MS analysis is effective for identification of molecular species because structure information of precursor ions is obtained from patterns of fragment ions. In addition, an influence of noise resulting from contaminants can be averted and therefore, MS/MS analysis is widely used also for quantitative analyses. How such analyses have been carried out will be described below.

A method of carrying out an MS/MS analysis using an ion trap is described, for example, in U.S. Pat. No. 7,078,685. Sample ions are introduced into the ion trap to be trapped. Next, all ions of the trapped ions excluding specific precursor ions are removed. Subsequently, precursor ions remaining in the trap are caused to be dissociated by, for example, collisional dissociation with an inert gas. Lastly, fragment ions generated by dissociation of precursor ions are selectively ejected based on masses.

A method of carrying out an MS/MS analysis using a mass analyzer constituted by inserting a collisional dissociation part between two quadrupole mass filters is described, for example, in Biomedical mass spectrometry, Vol. 8, p 397 (1981). Only specific precursor ions of ions introduced into the mass analyzer are allowed to selectively pass through the first-stage quadrupole mass filter to remove all other ions. Next, the precursor ions are caused to be dissociated by the collisional dissociation part by means of, for example, collisional dissociation with an inert gas. The second-stage quadrupole mass filter is used to carry out a mass analysis of fragment ions generated in the collisional dissociation part.

A method of carrying out an MS/MS analysis using a mass analyzer constituted by inserting a collisional dissociation part between a quadrupole mass filter and a time-of-flight mass analyzer is described, for example, in Rapid Communications in Mass Spectrometry, Vol. 10, pp. 889-896 (1996). Only specific precursor ions of ions introduced into the mass analyzer are allowed to selectively pass through the quadrupole mass filter to remove all other ions. Next, precursor ions are caused to be dissociated by the collisional dissociation part by means of, for example, collisional dissociation with an inert gas. The time-of-flight mass analyzer is used to carry out a mass analysis of fragment ions generated in the collisional dissociation part. Though, with this constitution, the mass analysis of fragment ions can be carried out with higher resolution compared with a constitution in which a quadrupole mass filter is used for mass analysis of fragment ions, utilization efficiency of ions will decline.

A method of carrying out an MS/MS analysis using a mass analyzer constituted by inserting a collisional dissociation part between two time-of-flight mass analyzers is described, for example, in U.S. Pat. No. 5,464,985. The first-stage time-of-flight mass analyzer is used to carry out an MS/MS analysis of ions introduced into the mass analyzer and only specific precursor ions are introduced into the collisional dissociation part to remove all other ions. Next, precursor ions are caused to be dissociated by the collisional dissociation part by means of, for example, collisional dissociation with an inert gas. Lastly, the second-stage time-of-flight mass analyzer is used to carry out a mass analysis of fragment ions generated in the collisional dissociation part. With this constitution, precursor ions can be selected with higher resolution compared with a constitution in which a quadrupole mass filter is used for selection of precursor ions.

A method of carrying out a precursor scan or neutral loss scan, which are a type of the MS/MS analysis, using a mass analyzer constituted by inserting a collisional dissociation part between an ion trap and a time-of-flight mass analyzer or between an ion trap and a quadrupole mass filter is described, for example, in U.S. Pat. No. 6,504,148. Ions introduced into the mass analyzer are once trapped in the ion trap. The trapped ions are successively ejected before being introduced into the collisional dissociation part. Next, precursor ions are caused to be dissociated by the collisional dissociation part by means of, for example, collisional dissociation with an inert gas. Subsequently, the time-of-flight mass analyzer or the quadrupole mass filter is used to carry out a mass analysis of fragment ions generated in the collisional dissociation part. With this constitution, utilization efficiency of ions by the precursor ion scan or neutral loss scan will be higher compared with a case in which precursor ions are selected by a time-of-flight mass analyzer or a quadrupole mass filter.

SUMMARY OF THE INVENTION

A subject of the present invention is to enable high-sensitivity and high-throughput MS/MS measurement.

In each of the aforementioned conventional examples (U.S. Pat. Nos. 7,078,685 and 5,464,985, Biomedical mass spectrometry, Vol. 8, p 397 (1981) and Rapid Communications in Mass Spectrometry, Vol. 10, pp. 889-896 (1996)), all ions other than specific precursor ions are removed in a process in which precursor ions are selected. Thus, the conventional examples have a common problem that utilization efficiency of ions is low.

In the aforementioned conventional example (U.S. Pat. No. 6,504,148), ions trapped in an ion trap are ejected at a fixed scanning rate and therefore, useful information cannot be obtained from an m/z area where no precursor ions to be measured are present. If the scanning rate is increased, on the other hand, ejection efficiency of ions from the ion trap and mass resolution will decline. Thus, the conventional example has a problem that detection sensitivity and throughput cannot be achieved at the same time. In addition, optimal kinetic energy of ions introduced into a collisional dissociation part changes depending on the ion type and the conventional example contains neither description nor suggestion regarding energy control.

A mass analyzer according to the present invention includes an ion trap for ejecting ions in a specific mass range, a collisional dissociation part for dissociating ions ejected from the ion trap, and a mass analyzing part for carrying out a mass analysis of ions ejected from the collisional dissociation part, wherein ions introduced into and accumulated in the ion trap are selectively resonance-ejected based on masses and a scanning operation in the present method is a repetition of an operation of ejecting specific precursor ions in a direction of the collisional dissociation part and an operation of ejecting nothing. Ejection of ions is controlled by changing the value of voltage applied to an electrode provided on the side of ion ejection of the ion trap.

A wire electrode or an exit electrode, for example, can be used as an electrode provided on the side of ion ejection of an ion trap.

Moreover, a control part of a mass analyzer according to the present invention includes a list composed of information including m/z of fragment ions to be measured and precursor ions thereof, kinetic energy of ions introduced into a collisional dissociation part, and the DC voltage applied to vane electrodes of the collisional dissociation part, and each ion can be measured under optimal measurement conditions by ejecting specific precursor ions included in the list in ascending order of m/z and controlling the output voltage of each part by referring to the list information.

According to the present invention, high-sensitivity and high-throughput MS/MS measurement is enabled.

BRIEF DESCRIPTION OF THE DRAWINGS

FIGS. 8A and 8B are diagrams illustrating voltage control during mass scanning in the third embodiment;

FIG. 9 is a diagram of the configuration in a fourth embodiment of the present method.

DESCRIPTION OF REFERENCE NUMERALS

Figure 1:
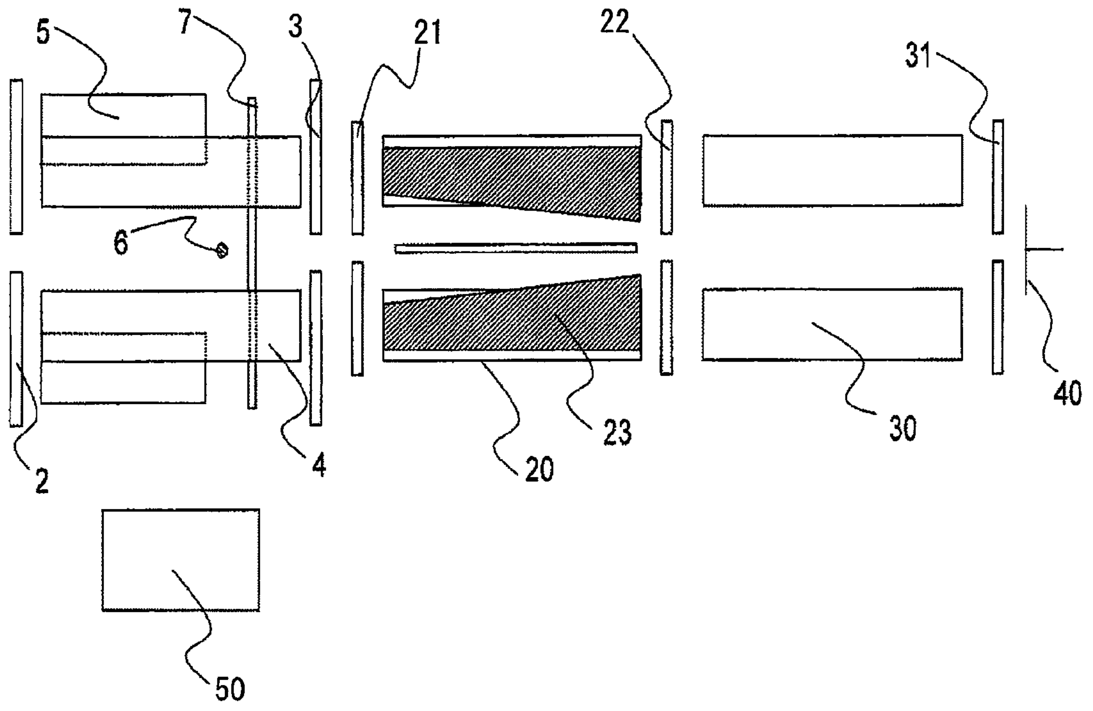
FIG. 1 is a diagram of a configuration in a first embodiment of a present method.

2: Inlet electrode
3: Exit electrode
4: Quadrupole rod electrode
5: Vane electrode
6: Pre-wire electrode
7: Rear wire electrode
20: Multipole rod electrode
21: Inlet electrode
22: Exit electrode
23: Vane electrode
30: Quadrupole rod electrode
40: Detector
61: Ion ejection operation
62: Standby operation
101: Inlet electrode
103: Exit electrode
102: Quadrupole rod electrode
200: Vane electrode
201: Inlet electrode
202: Exit electrode
203: Quadrupole rod electrode
300: Ion lens
301: Pusher
302: Extractor
303: Reflector
304: Detector

DESCRIPTION OF THE PREFERRED EMBODIMENTS

First Embodiment

FIG. 1 is a diagram of the configuration of a mass analyzer according to the present method. However, an exhaust system such as a pump and an introduction system of a buffer gas and the like are omitted for brevity. In first to fourth embodiments, values of the DC voltage for measuring positive ions are shown as an example of DC voltage application. For measurement of negative ions, it is necessary only to reverse signs of all DC voltages. Though a DC offset voltage (0 to 500 V) may be applied to an ion trap part and a collisional dissociation part, values obtained by subtracting the offset voltages from the actually applied voltages are shown for all voltages shown in the first to fourth embodiments.

Ions generated by an ion source such as an electro spray ion source, an atmospheric pressure chemical ion source, an atmospheric pressure photo ion source, and an atmospheric pressure matrix assisted laser desorption ion source are introduced into the ion trap part.

The ion trap part includes inlet electrodes 2, exit electrodes 3, quadrupole rod electrodes 4, vane electrodes 5 inserted into a gap of the quadrupole rod electrodes, a pre-wire electrode 6, and a rear wire electrode 7. An RF voltage generated by an RF power supply and having alternately inverted phases is applied to the quadrupole rod electrodes 4. Typical amplitudes of the RF voltage are several hundred to 5000 V and typical frequencies are 500 kHz to 2 MHz. A buffer gas to be maintained at about $10^{-4}$ Torr to $10^{-2}$ Torr ($1.3\times10^{-2}$ Pa to 1.3 Pa) is introduced into the ion trap part. Quadrupole rod electrodes are used herein for a description, but rod electrodes are not limited to quadrupoles, and multipoles, that is, rod electrodes of, for example, six or eight poles may also be used.

Measurements are made in three sequences. The trap RF amplitude value is set at 100 to 1000 V for a trap time. As an example of applied voltages to other electrodes, the inlet electrodes 2 are set at 20 V, the vane electrodes 5 at 0 V, the trap electrode 6 at 20 V, the extract electrode 7 at 20 V, and the exit electrodes 3 at 20 V. A pseudo-potential is formed by the trap RF voltage in a diameter direction of a quadrupole electric field and a DC potential is formed in a center axis direction of the quadrupole electric field and therefore, ions introduced into the ion trap part are trapped in an area enclosed by the inlet electrodes 2, quadrupole rod electrodes 4, vane electrodes 5, and trap electrode 6. The trap duration is about 1 ms to 1000 ms and heavily depends on a quantity of ions introduced into the ion trap part.

In a mass scanning time, ions are selectively resonance-ejected based on masses by changing the trap RF amplitude. An example of voltage application in a mass scanning time is shown. Supplemental AC (amplitude: 0.01 to 1 V; frequency: 10 to 500 kHz) is applied between the vane electrodes 5. In addition, a voltage of about 3 to 10 V is applied to the trap electrode 6. By changing the value of DC voltage applied to the extract electrode 7, an operation to cause the ejection of ions in an axial direction and an operation to cause no ejection can be switched. Details of a method of controlling the voltage in the mass scanning time will be described later.

Lastly, all voltages are set at 0 V in a removal time to eject all ions out of the trap. The duration of removal time is about 0.1 to 1 ms.

A collisional dissociation part includes four quadrupole rod electrodes 20, inlet electrodes 21, exit electrodes 22, and vane electrodes 23.

A buffer gas such as nitrogen is introduced into the collisional dissociation part to maintain the pressure at about 5 to 20 mTorr. In the collisional dissociation part, fragment ions are generated by dissociation after collision of introduced precursor ions with the buffer gas. Collisional dissociation can advance efficiently by setting a potential difference between the offset potential of the ion trap and that of the multipole rod electrodes 20 at about 20 to 100 V. An accelerating potential in the axial direction is formed on the center axis of the collisional dissociation part by applying a DC voltage of 0.5 to 20 V to the vane electrodes 23. With this accelerating potential, ions can efficiently be transported to the vicinity of the exit electrodes 22. Fragment ions generated by dissociation are introduced into a quadrupole mass filter.

The quadrupole mass filter includes four quadrupole rod electrodes 30 and is maintained at a pressure of 1 mTorr or less. An RF voltage generated by an RF power supply and having alternately inverted phases and a DC voltage generated by a DC power supply and having alternately inverted phases are applied to the quadrupole rod electrodes 30. Typical amplitudes of the RF voltage are several hundred V to several kV and typical frequencies are about 500 kHz to 2 MHz, and typical amplitudes of the DC voltage are about several tens V to several hundred V. The m/z range of ions in which stable orbital motion becomes possible in the quadrupole mass filter depends on the RF amplitude and DC amplitude. Thus, by selecting specific values for the RF amplitude and DC amplitude, it is possible to allow only ions in the m/z range to pass through the quadrupole mass filter. It is also possible to obtain a mass spectrum by sweeping the DC and RF amplitudes while maintaining the ratio of the RF amplitude to the DC amplitude constant. Ions that have passed through the quadrupole mass filter are detected by a detector 40.

A controller 50 has a list composed of information including m/z of fragment ions to be measured and precursor ions thereof, kinetic energy of ions introduced into a collisional dissociation part, and the DC voltage applied to the vane electrodes 23 of the collisional dissociation part, and controls the output voltages of the ion trap part, collisional dissociation part, and quadrupole mass filter based on the list. The list is manually inputted or can automatically be generated by a method described later.

In the present embodiment, the output voltage of each part is controlled based on information of the list and high-sensitivity and high-throughput MS/MS measurement is enabled by measurements made by switching at least two scanning rates. Concrete methods of controlling each part will be described below.

Figures 2A, 2B, 2C:
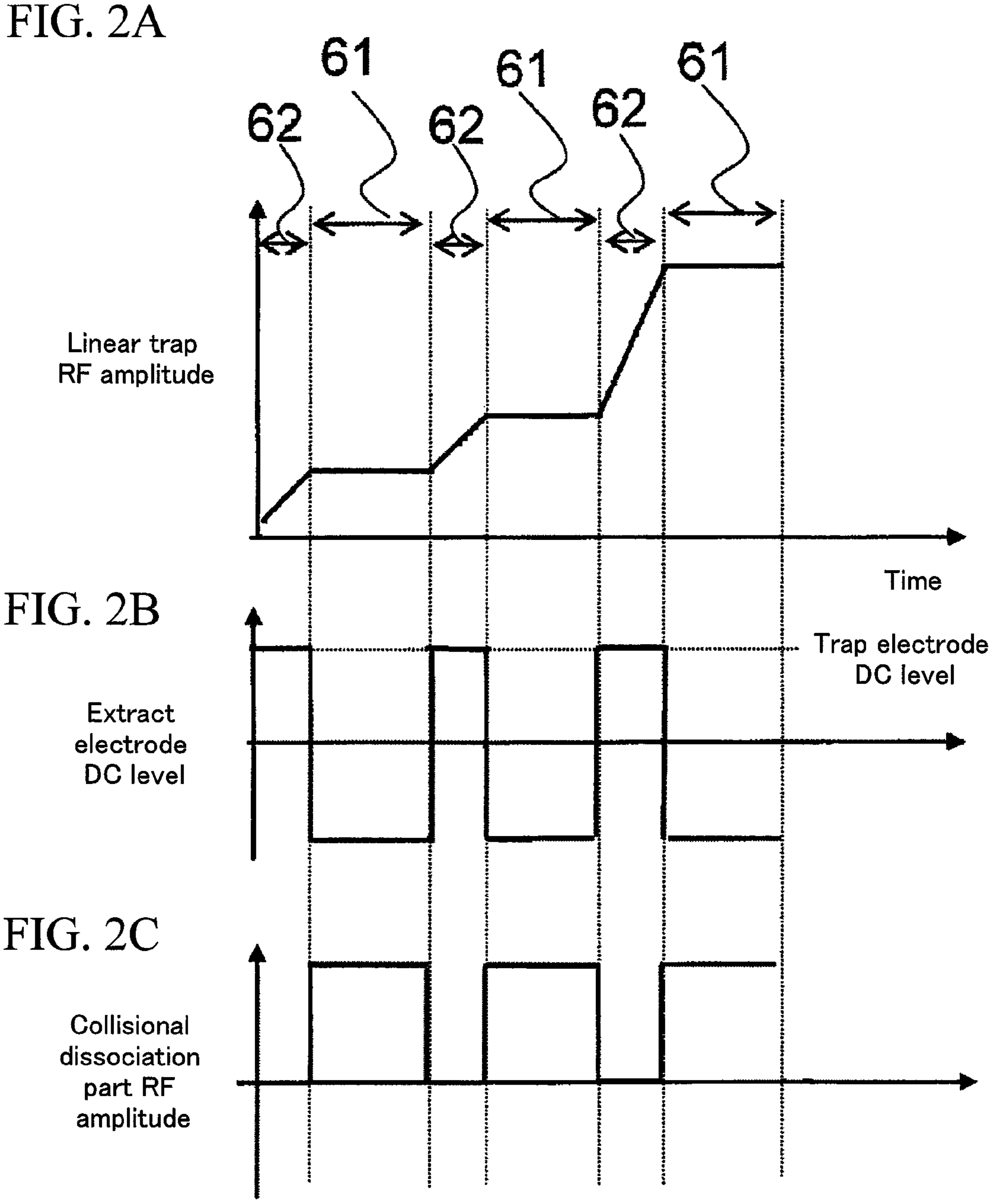
FIGS. 2A, 2B and 2C are diagrams illustrating voltage control during mass scanning in the first embodiment.

First, voltage control of the ion trap part will be described. FIG. 2A shows a situation of scanning the trap RF amplitude in the present method and FIG. 2B shows the voltage of the extract electrode 7 during the scanning. In a scanning operation in the present method, an ion ejection operation 61 of ejecting specific precursor ions included in the list in the direction of the collisional dissociation part and a standby operation 62 of not ejecting ions in the direction of the collisional dissociation part are repeated. The duration of one ion ejection operation 61 is 500 to 5000 μs and that of the standby operation 62 is 200 to 2000 μs. The ion ejection operation 61 ejects precursor ions included in the list in ascending order of m/z and repeats itself until all ions included in the list are ejected. The applied voltages during the ion ejection operation 61 and the standby operation 62 will be described below.

In the ion ejection operation 61, the voltage of the extract electrode is set at about −10 to −20 V to form a DC extraction field. The trap RF amplitude is fixed to resonance excitation conditions for precursor ions to be ejected or is scanned in areas of 1 amu or so above and below the resonance excitation conditions for precursor ions to be ejected at a scanning rate of about 0 to 1000 Th/s. If scanning should be performed, areas to be scanned are set in such a way that ions other than precursor ions to be ejected are not ejected. Precursor ions ejected by the ion ejection operation 61 from the ion trap part are introduced into the collisional dissociation part.

Figure 3A:
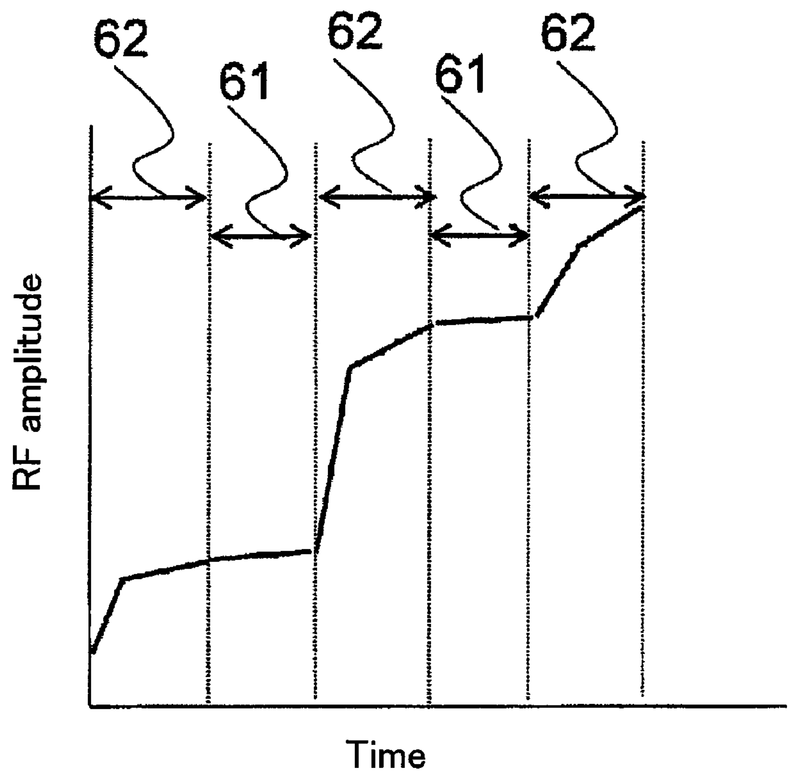
FIGS. 3A and 3B are diagrams illustrating voltage control during mass scanning in the first embodiment.
Figure 3B:
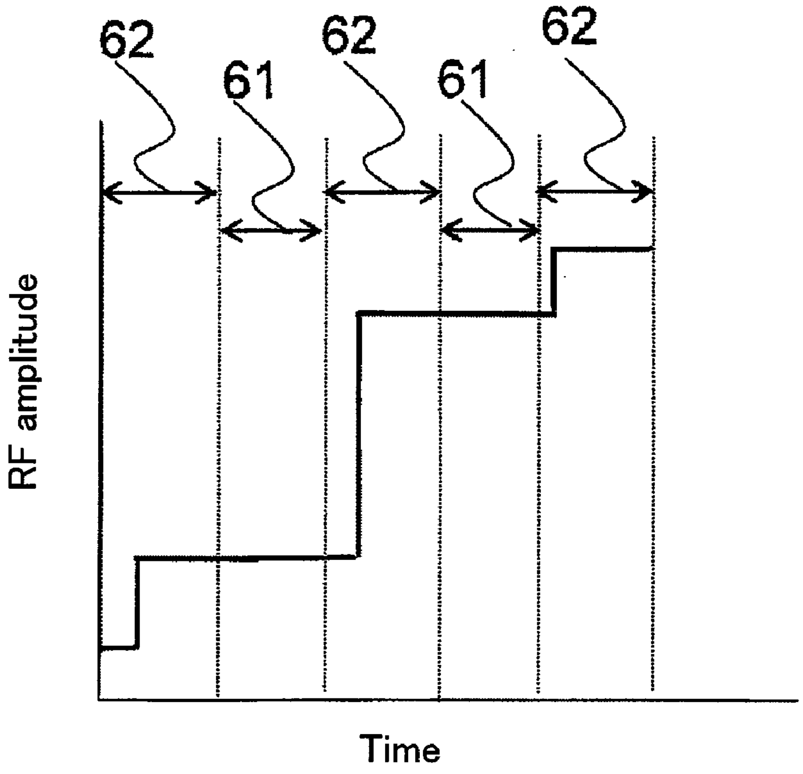

In the standby operation 62, the voltage of the extract electrode is set to the same potential as that of the trap electrode so that ions are not ejected in the direction of the collisional dissociation part. The trap RF amplitude is scanned up to the vicinity of resonance conditions of precursor ions to be ejected by the next ion ejection operation 61. At this time, instead of scanning at a constant rate of about 100 to $10^7$ Th, as shown in FIG. 2A, scanning is performed by switching two or more scanning rates, as shown in FIG. 3A, or maintaining the trap RF amplitude constant until the voltage stabilizes after changing the amplitude at a stroke, as shown in FIG. 3B, the duration of the standby operation 62 can be shortened, further increasing throughput of measurement.

By not introducing ions into the collisional dissociation part during the standby operation 62, stagnation of ions in the collisional dissociation part can be prevented and crosstalk in the ion ejection operation immediately thereafter can be avoided.

Next, an operation of the collisional dissociation part will be described. FIG. 2C shows changes of the RF voltage of the collisional dissociation part. A quadrupole potential is formed in the diameter direction by applying the RF voltage while the ion trap part performs the ion ejection operation 61 to allow generated fragment ions to pass efficiently. At this time, kinetic energy of ions introduced into the collisional dissociation part and intensity of a DC electric field formed on the axis are set to optimal values by referring to the list. Accordingly, high-sensitivity detection of fragment ions can be implemented. On the other hand, the RF amplitude of the collisional dissociation part is set at 0 V during the standby operation 62 of the ion trap part to remove all ions remaining in the collisional dissociation part. About 0.5 to 5 ms is enough as a duration in which the RF amplitude of the collisional dissociation part is set at 0 V and the RF amplitude can be set at 0 V at any timing during the standby operation 62. By removing all ions remaining in the collisional dissociation part, crosstalk between precursor ions introduced into the collisional dissociation part in the ion ejection operation 61 immediately before and fragment ions thereof and ions introduced in the ion ejection operation 61 immediately after can be avoided.

Lastly, the quadrupole RF amplitude and quadrupole DC voltage are controlled so that, among fragment ions introduced from the collisional dissociation part, fragment ions to be measured and included in the list are allowed to selectively pass through the quadrupole mass filter.

With controls described above, high-sensitivity and high-throughput MS/MS measurement is enabled. Effectiveness of the present method will be described below. Assume that 10 types of precursor ions exist in an area of m/z 300 to m/z 1300. First, a time required when measurement is made in the present method is determined. The measuring time in the present method is given by the Formula below (Formula 1):

$$S_{ej}n/v_{ej}+t_w(n-1) \quad \text{(Formula 1)}$$

where $v_{ej}$ is the scanning rate during ion ejection operation, $S_{ej}$ is the scanning range during ion ejection operation, n is the number of precursor ions to be measured, and $t_w$ is the standby time. If measurement is made under the conditions of $v_{ej}$=1000 Th/s, $S_{ej}$=1 Th, and $t_w$=1 ms, the time required for one scan is 19 ms. If, on the other hand, measurement is made at a scanning rate of 1000 Th/s in the aforementioned conventional example, (Patent Document 4), the time required for one scan is 1000 ms. Therefore, throughput according to the present method under these measurement conditions is about 50 times that of the conventional example, (Patent Document 4). Mass resolution and ejection efficiency of ions are the same because the scanning rate in the vicinity of precursor ions is 1000 Th/s in both methods. This shows that the present method enables high-throughput MS/MS measurement while maintaining high sensitivity.

Also in the present method, a list enumerating optimal measurement conditions for each ion is manually or automatically created so that high sensitivity can be obtained by adjusting to these optimal measurement conditions at a time of measurement. A method of creating such a list automatically will be described below. First, a mass scan is made by the ion trap part to measure the MS spectrum. At this time, offset voltages of the collisional dissociation part and the ion trap part are made smaller (about 0 to 5 V) so that a condition is set under which ions are more unlikely to undergo collisional dissociation. The quadrupole mass filter is made to serve as an ion guide by setting the quadrupole DC voltage at 0 V or performs scanning so that conditions for ions of m/z ejected from the ion trap part to transmit are maintained. Information of m/z of precursor ions is automatically added to the list by, for example, extracting m/z of ion types whose intensity is equal to or greater than a preset threshold from the obtained MS spectrum. Next, the MS/MS spectrum of each type of precursor ions is measured and information of m/z of product ions by, for example, extracting m/z of product ions of high intensity. At this time, the ion trap part sets the pre-wire electrode 6 and the rear wire electrode 7 to the same potential as the offset potential of the quadrupole rods to be made to operate as a quadrupole mass filter to allow only target precursor ions to pass continuously. Next, variables such as kinetic energy of ions introduced into the collisional dissociation part and the DC voltage applied to the vane electrodes 23 of the collisional dissociation part are scanned for each type of fragment ions and values providing maximum intensity of fragment ions are added to the list.

Figure 4:
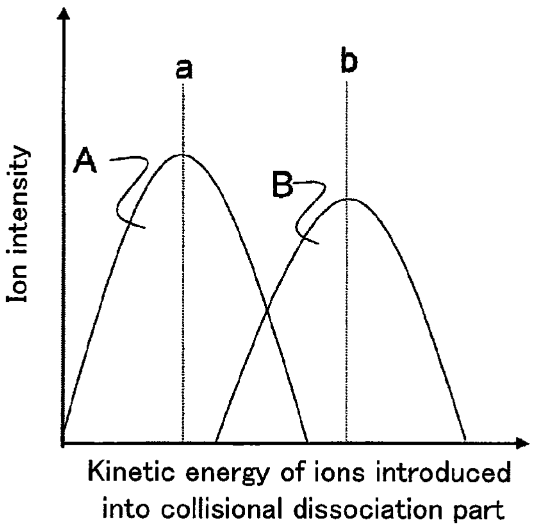
FIG. 4 is a diagram illustrating advantages of the first embodiment.

In the present method, high sensitivity can be obtained by automatically optimizing such measurement conditions. Some examples showing effectiveness of the present method are given below. FIG. 4 schematically shows dependence on kinetic energy of ions introduced into the collisional dissociation part of ion signal intensity of two types of ions A and B. In the conventional example (Patent Document 4), both types of ions are measured under the same conditions and therefore, sensitivity of B ions is low under conditions of a and sensitivity of A ions is low under conditions of b. In the present method, optimal measurement conditions are set adjusting to ions and therefore, A ions are measured under conditions of a and B ions are measured under conditions of b so that high-sensitivity detection of both types of ions can be implemented. Thus, each type of ions is measured under optimal measurement conditions in the present method and therefore, higher sensitivity than that of the conventional example (Patent Document 4) can be obtained.

Second Embodiment

Figure 5A:
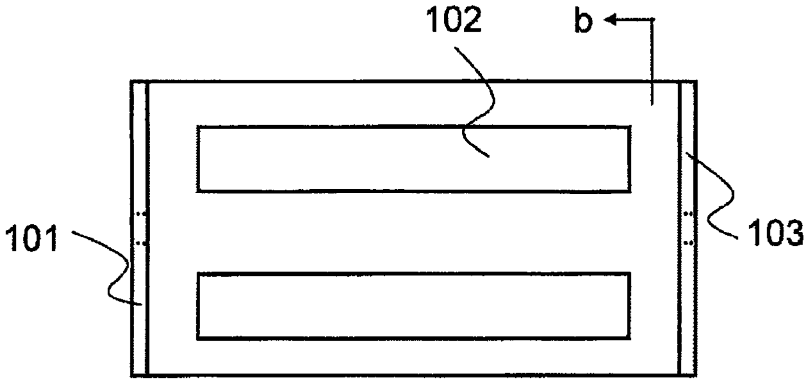
FIGS. 5A and 5B are diagrams of the configuration in a second embodiment of the present method.
Figure 5B:
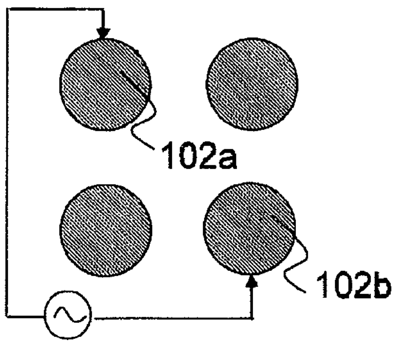

FIGS. 5A and 5B show structures of an ion trap part. The ion trap part includes inlet electrodes 101, quadrupole rod electrodes 102, and exit electrodes 103. Other components than the ion trap part are the same as those of the (first embodiment) and a description thereof will not be described herein. An RF voltage generated by an RF power supply and having alternately inverted phases is applied to the quadrupole rod electrodes 102. Typical amplitudes of the RF voltage are several hundred to 5000 V and typical frequencies are about 500 kHz to 2 MHz. A buffer gas to be maintained at about $10^{-4}$ Torr to $10^{-2}$ Torr ($1.3\times10^{-2}$ Pa to 1.3 Pa) is introduced into the ion trap part (not shown).

Measurements are made in three sequences. The trap RF amplitude value is set at about 100 to 1000 V for the trap time. As an example of applied voltages to other electrodes, the inlet electrodes 101 are set at 20 V and the exit electrodes 103 at about 20 V. A pseudo-potential is formed by the trap RF voltage in the diameter direction of a quadrupole electric field and a DC potential is formed in the center axis direction of the quadrupole electric field and therefore, ions introduced into the ion trap part are trapped in an area enclosed by the inlet electrodes 101, quadrupole rod electrodes 102, and exit electrodes 103. Ions are selectively excited based on masses by changing the trap RF amplitude in a mass scanning time. An example of voltage application in the mass scanning time is shown. Supplemental AC (amplitude: 0.01 to 1 V; frequency: 10 to 500 kHz) is applied between a pair of quadrupoles 102(*a, b*) facing each other. By changing the value of DC voltage applied to the exit electrodes 103, an operation to cause the ejection of ions in the axial direction and an operation to cause no ejection can be switched. Voltage control in the mass scanning time will be described later.

Lastly, all voltages are set at 0 V in the removal time to eject all ions out of the trap. The duration of removal time is about 0.1 to 1 ms.

In the present embodiment, the output voltage of each part is controlled based on information of the list and high-sensitivity and high-throughput MS/MS measurement is enabled by measurements made by switching at least two scanning rates. Operations other than the voltage operation of the ion trap part in the mass scanning time are the same as those in the first embodiment and a description thereof will not be described herein. A concrete method of controlling the voltage of the ion trap part in the mass scanning time will be described below.

Figure 6A:
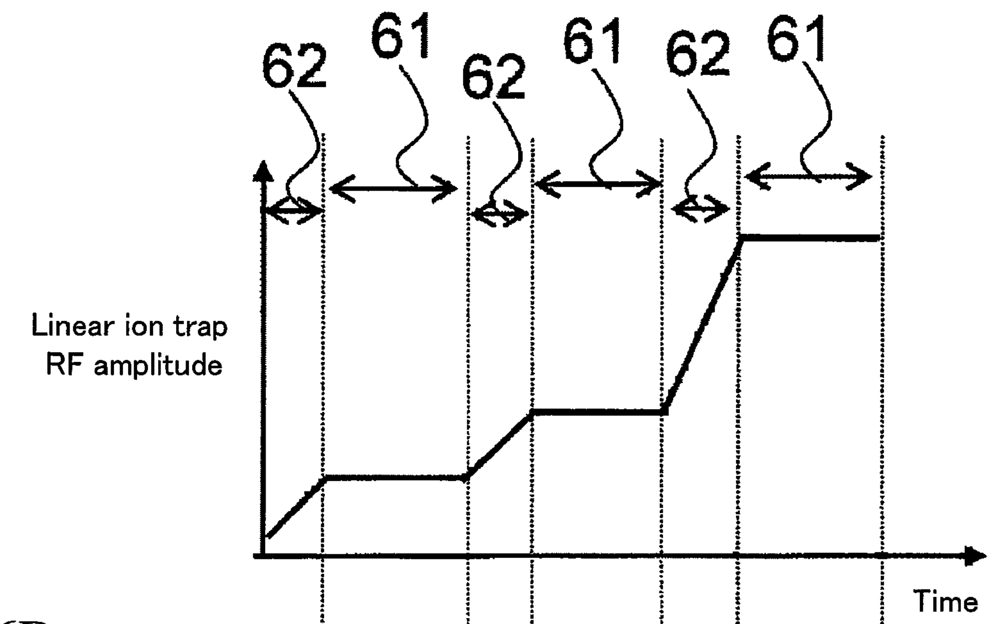
FIGS. 6A and 6B are diagrams illustrating voltage control during mass scanning in the second embodiment.
Figure 6B:
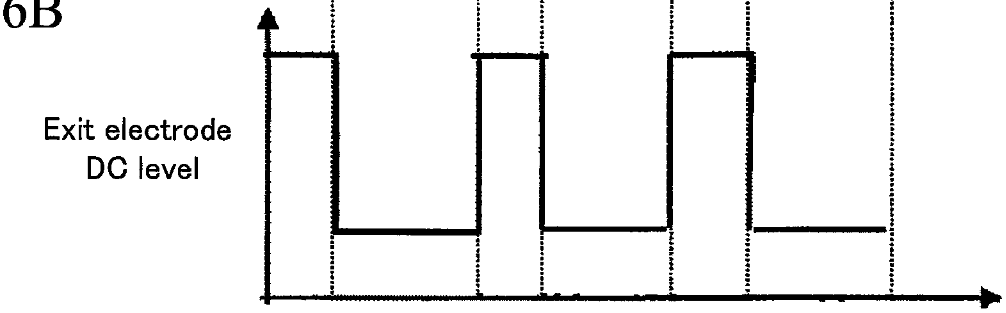

FIG. 6A shows the trap RF amplitude during scanning operation in the present embodiment and FIG. 6B shows the voltage of the exit electrodes 103. The duration of one ion ejection operation 61 is 500 to 5000 μs and that of the standby operation 62 is about 200 to 2000 μs.

In the ion ejection operation 61, the voltage of the exit electrodes 103 is set at about 0 to 10 V to eject ions by a fringing field formed between a trap RF electric field of the quadrupole rods and the exit electrodes 103. At this time, the trap RF amplitude is fixed to resonance excitation conditions for precursor ions to be ejected or is scanned in areas of 1 amu or so above and below the resonance excitation conditions for precursor ions to be ejected at a scanning rate of about 0 to 1000 Th/s. If scanning should be performed, areas to be scanned are set in such a way that ions other than precursor ions to be ejected are not ejected. Ions ejected by the ion ejection operation 61 from the ion trap part are introduced into the collisional dissociation part.

In the standby operation 62, the voltage of the exit electrodes 103 is set at about 10 to 100 V so that ions are not ejected in the direction of the collisional dissociation part. During the standby operation 62, the trap RF amplitude is scanned up to the vicinity of resonance conditions of precursor ions to be ejected by the next ion ejection operation 61 immediately thereafter. Scanning may be performed during the standby operation 62 at a constant rate of about 100 to $10^7$ Th or by switching two or more scanning rates. Alternatively, the trap RF amplitude may be maintained constant until the voltage stabilizes after changing the amplitude at a stroke.

Though the second embodiment has an advantage that the device structure is simpler than that of the first embodiment, detection sensitivity is higher in the first embodiment because ejection efficiency of ions is higher in the first embodiment.

Third Embodiment

Figure 7A:
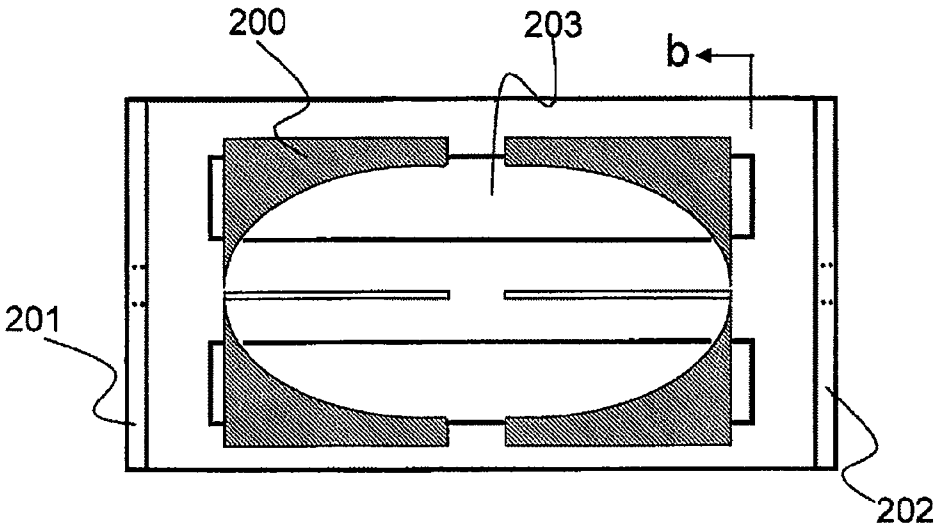
FIGS. 7A, 7B and 7C are diagrams of the configuration in a third embodiment of the present method.
Figure 7B:
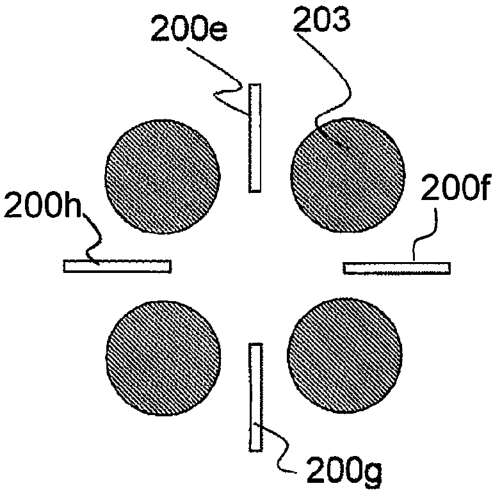
Figure 7C:
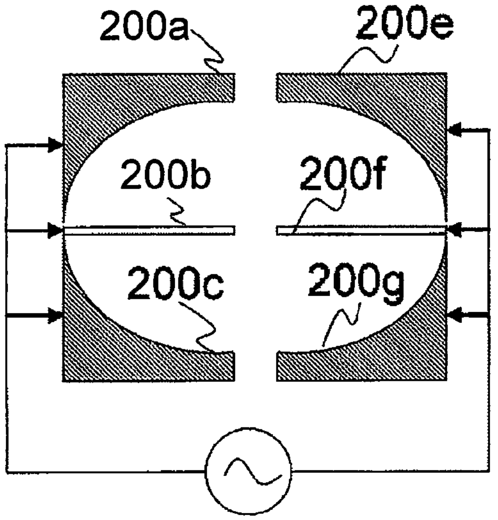

FIGS. 7A, 7B and 7C show the structures of an ion trap part. The ion trap part includes vane electrodes 200, inlet electrodes 201, quadrupole rod electrodes 203, and exit electrodes 202.

The vane electrodes 200 use electrodes in a shape that optimizes a potential on the center axis of the ion trap. For example, the vane electrodes 200 have an arc-shaped dent and are inserted between the quadrupole rod electrodes 203 with edges having an arc directed toward the center axis. The vane electrodes 200 are also divided into two parts in the center axis direction (referring to 200*a* and 200*e*, 200*b* and 200*f*, 200*c* and 200*g*, and 200*d* and 200*h*). Other components than the ion trap part are the same as those of the (first embodiment) and a description thereof will not be described herein. An RF voltage generated by an RF power supply and having alternately inverted phases is applied to the quadrupole rod electrodes 203. Typical amplitudes of the RF voltage are several hundred to 5000 V and typical frequencies are 500 kHz to 2 MHz. A buffer gas to be maintained at about $10^{-4}$ Torr to $10^{-2}$ Torr ($1.3\times10^{-2}$ Pa to 1.3 Pa) is introduced into the ion trap part (not shown). Quadrupole rod electrodes are used herein for a description, but rod electrodes are not limited to quadrupoles, and multipoles, that is, rod electrodes of, for example, six or eight poles may also be used.

Measurements are made in three sequences. The trap RF amplitude value is set at about 100 to 1000 V and the DC voltage to be applied to the vane electrodes 200 is set at 10 to 200 V for the trap time. As an example of applied voltages to other electrodes, the inlet electrodes 201 are set at 10 V and the exit electrodes 202 at about 50 V. A pseudo-potential is formed by the trap RF voltage in the diameter direction of the ion trap part. A harmonic DC potential for enclosing ions is formed in the center axis direction by applying a DC voltage of the same polarity as that of ions to be trapped to the vane electrodes 200. Thus, ions introduced into the ion trap part are trapped in an area enclosed by the quadrupole rod electrodes 203 and vane electrodes 200.

In a mass scanning time, ions are selectively resonance-ejected based on masses by applying supplemental AC of the amplitudes 1 to 30 V and frequencies about 1 to 100 kHz between the vane electrodes 200(*a, b, c, d*) and 200(*e, f, g, h*). At this time, phases of the supplemental AC are set so that the vane electrodes 200 at the same position on the center axis (between 200(*a, b, c, d*) and 200(*e, f, g, h*)) have the same phase and electrodes facing each other in the center axis direction (between 200*a* and 200*e*, between 200*b* and 200*f*, between 200*c* and 200*g*, and between 200*d* and 200*h*) have opposite phases. Only ions of m/z where the frequency of the supplemental AC and the resonance frequency in the center axis direction coincide are selectively excited based on masses in the axial direction. At this time, by changing the value of DC voltage applied to the exit electrodes 202, an operation to cause the ejection of resonance-excited ions in the axial direction and an operation to cause no ejection can be switched. Voltage control in the mass scanning time will be described later.

Lastly, all voltages are set at 0 V in the removal time to eject all ions out of the trap. The duration of removal time is about 0.1 to 1 ms.

In the present embodiment, the output voltage of each part is controlled based on information of the list and high-sensitivity and high-throughput MS/MS measurement is enabled by measurements made by switching at least two scanning rates. Operations other than the voltage operation of the ion trap part in the mass scanning time are the same as those in the first embodiment and a description thereof will not be described herein. A concrete method of controlling the voltage of the ion trap part in the mass scanning time will be described below.

FIG. 8A shows the frequency of supplemental AC during scanning operation in the present embodiment and FIG. 8B shows the voltage of the exit electrodes 202. The duration of one ion ejection operation 61 is 500 to 5000 μs and that of the standby operation 62 is about 200 to 2000 μs.

In the ion ejection operation 61, the voltage of the exit electrodes 202 is set at about 0 to 15 V so that ions can be ejected in the axial direction. Also, the frequency of supplemental AC is fixed to resonance excitation conditions for precursor ions to be ejected or is scanned in areas of 1 amu or so above and below the resonance conditions for precursor ions to be ejected are scanned at a scanning rate of about 0 to 1000 Th/s. If scanning should be performed, areas to be scanned are set in such a way that ions other than precursor ions to be ejected are not ejected. Ions ejected by the ion ejection operation 61 are introduced into the collisional dissociation part.

In the standby operation 62, the voltage of the exit electrodes 202 is set at 20 to 50 V so that ions are not ejected in the direction of the collisional dissociation part. During the standby operation 62, the frequency of supplemental AC is changed up to resonance conditions of ions to be ejected by the ion ejection operation 61 immediately thereafter.

Since the direction in which ions are resonance-ejected and that in which ions are resonance-excited coincide in the third embodiment, the ejection rate of the ion trap part is high so that high-throughput measurement higher than that in the first and second embodiments can be made. However, the first and second embodiments have higher mass resolution of the ion trap part and more resistant to an influence of contaminants.

Fourth Embodiment

FIG. 9 is a diagram of the configuration of a mass analyzer according to the present method. The structure up to the ion trap part and collisional dissociation part is the same as that in the first embodiment and thus, a description thereof will not be described herein. Also, the ion trap part and collisional dissociation part are controlled in the same manner as in the first embodiment and thus, a description thereof will not be described herein.

The time-of-flight mass analyzer includes an ion lens 300, a pusher 301, an extractor 302, reflector 303, and a detector 304. Ions introduced into the time-of-flight mass analyzer are ion-converged by the ion lens 300 composed of a plurality of electrodes and then, introduced into an acceleration part of the time-of-flight mass analyzer composed of the pusher 301 and extractor 302. Ions are accelerated in a direction perpendicular to the direction of introduction of ions by applying a voltage of several hundred V to several kV between the pusher 301 and extractor 302 by power supply in an acceleration part. Ions accelerated in the perpendicular direction reaches the detector unchanged or reaches the detector including MCP after being deflected by passing through the reflector. The mass number of ions can be measured from a relationship between the acceleration start time of the acceleration part and the detection time of ions.

In addition to the information of the first embodiment, information of timing of the acceleration voltage application to the time-of-flight mass analyzer may be added to the list.

In the fourth embodiment, intensity information of fragment ions of the whole MS/MS spectrum can be obtained from ejection of precursor ions at a time from the ion trap part. Thus, though higher throughput can be obtained than that in the first, second, third embodiments even if the number of fragment ions to be measured is large, utilization efficiency of ions is higher in the first, second, third embodiments.

Figure 10A:
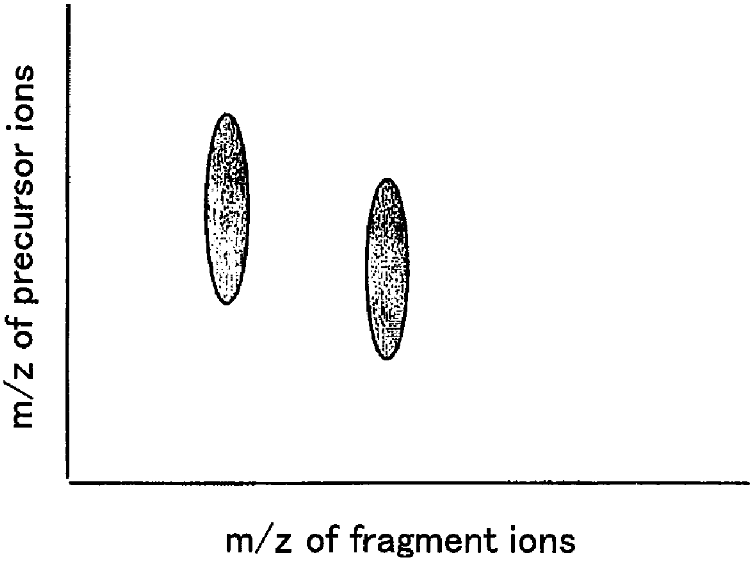
FIGS. 10A and 10B are diagrams illustrating advantages of the fourth embodiment of the present method.
Figure 10B:
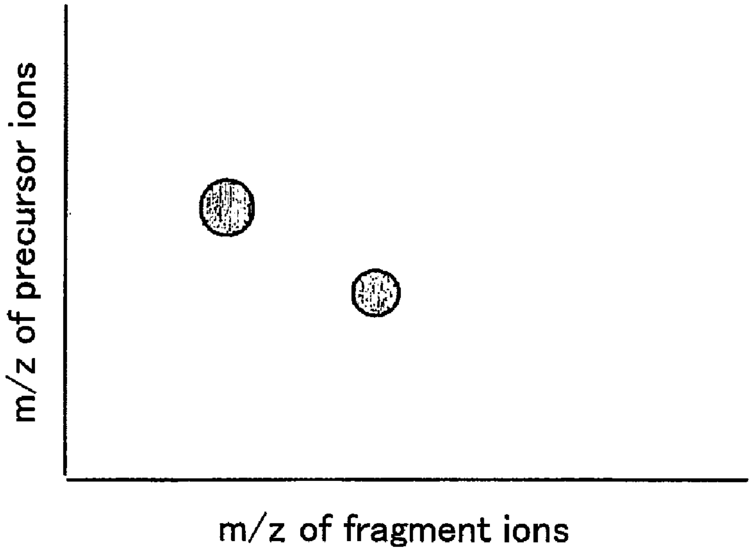

Also in the fourth embodiment, mass resolution of the time-of-flight mass analyzer can be used as the mass resolution of precursor ions for MS/MS measurement. A concrete method will be described below. First, the ion trap part is caused to operate as a normal quadrupole mass ion guide to allow ions to pass without selecting m/z. Also conditions that the dissociation of precursor ions by collision is unlikely to occur are created by setting kinetic energy of ions introduced into the collisional dissociation part lower. The spectrum of precursor ion MS can be measured by analyzing ions ejected by the collisional dissociation part under the above conditions by the time-of-flight mass analyzer. Information of the spectrum of the precursor ions is stored in the list. Next, the ion trap part is scanned to make MS/MS measurement. At this time, the mass resolution of precursor ions is determined by that of the ion trap part. FIG. 10A shows spectra obtained by plotting intensity of observed product ions with respect to m/z of precursor ions and that of product ions. Spectra are reconstructed by replacing the mass resolution of precursor ions in FIG. 10A with the MS spectrum of precursor ions measured by the time-of-flight mass analyzer, which is stored in the list. FIG. 10B shows reconstructed spectra. Since higher resolution can be obtained from the time-of-flight mass analyzer than from the ion trap or quadrupole mass filter, interpretation of spectra is made easier by using the resolution of the time-of-flight mass analyzer as the resolution of precursor ions. Though not specifically mentioned, m/z of precursor ions can similarly be measured by a mass analyzing part in the first, second, and third embodiments to use the resolution of the mass analyzing part as the mass resolution of precursor ions.

The ion trap part used in the present method may be an ion trap other than that described in the first to fourth embodiments if the ion trap can selectively eject trapped ions based on masses. Though quadrupoles are used in the collisional dissociation part in the first to fourth embodiments, multipoles such as eight poles or 16 poles may also be used. In addition, any mass analyzing part other than that shown in the above embodiments such as FT-ICR that can measure ion intensity by sorting out masses is permitted.

What is claimed is:

1. A mass analyzer, comprising;

an ion trap for ejecting ions in a specific mass range;

a collisional dissociation part for dissociating ions ejected from said ion trap;

a mass analyzing part for performing a mass analysis of ions ejected from said collisional dissociation part; and a control part for controlling voltages applied to electrodes of said ion trap, said collisional dissociation part, and said mass analyzing part, wherein said control part changes the mass range of ions ejected from said ion trap by two or more scanning rates, as determined by a list, in each mass scanning time, and controls a set of voltages during a first period of a first scanning rate of said mass scanning time as ions are ejected, in which ions are introduced into the collisional dissociation part; and another set of voltages during a second period of a second scanning rate of said mass scanning time as ions are ejected, in which ions are not introduced into the collisional dissociation part.

2. The mass analyzer according to claim 1, wherein said ion trap has an electrode provided on a side of ion ejection of said ion trap, and said control part controls ejection of ions by changing a value of the voltage applied to the electrode provided on the side of ion ejection of said ion trap.

3. The mass analyzer according to claim 2, wherein the electrode provided on the side of ion ejection of said ion trap is a wire electrode provided among rods facing each other of a plurality of rod electrodes constituting said ion trap.

4. The mass analyzer according to claim 1, wherein said list in which list has measurement conditions for each ion, and said control part controls the voltages applied to the electrodes of said ion trap, said collisional dissociation part, and said mass analyzing part with reference to said list.

5. A mass analyzer, comprising;

an ion trap for ejecting ions in a specific mass range;

a collisional dissociation part for dissociating ions ejected from said ion trap;

a mass analyzing part for performing a mass analysis of ions ejected from said collisional dissociation part; and a control part for controlling voltages applied to electrodes of said ion trap, said collisional dissociation part, and said mass analyzing part, wherein said control part changes the mass range of ions ejected from said ion trap by two or more scanning rates in each mass scanning time, and controls a set of voltages during a first period of a first scanning rate of said mass scanning time as ions are ejected, in which ions are introduced into the collisional dissociation part; and another set of voltages during a second period of a second scanning rate of said mass scanning time as ions are ejected, in which ions are not introduced into the collisional dissociation part;

wherein said control part comprises a list in which measurement conditions for each ion are stored, said control part controls the voltages applied to the electrodes of said ion trap, said collisional dissociation part, and said mass analyzing part with reference to said list, said control part controls the voltage applied to the electrodes of said ion trap with reference to said list to switch, in said mass scanning time, said first period in which ions are ejected in a direction of said collisional dissociation part, and said second period in which ions are not ejected in the direction of said collisional dissociation part.

6. The mass analyzer according to claim 5, wherein said control part fixes a trap RF amplitude to resonance excitation conditions for ions to be ejected or causes said trap RF amplitude to be scanned by setting areas to be scanned so that ions other than those to be ejected are not ejected in the time when ions are ejected in the direction of said collisional dissociation part and said control part causes said trap RF amplitude to be scanned up to a vicinity of resonance conditions of ions to be ejected next in the time when ions are not ejected in the direction of said collisional dissociation part.

7. The mass analyzer according to claim 6, wherein said control part causes said trap RF amplitude to be scanned up to the vicinity of the resonance conditions of ions to be ejected next, in the time when ions are not ejected in the direction of said collisional dissociation part, at a constant rate or by switching two or more scanning rates.

8. The mass analyzer according to claim 4, wherein said control part sets a kinetic energy of ions introduced into said collisional dissociation part and an intensity of a DC electric field formed on a center axis of said collisional dissociation part depending on ion type with reference to said list.

9. The mass analyzer according to claim 4, wherein said list is created with a value of the applied voltage that provides maximum signal intensity by scanning the applied voltage while monitoring the signal intensity.

10. The mass analyzer according to claim 1, wherein said ion trap has vane electrodes provided between adjacent rods of a plurality of rod electrodes constituting said ion trap and said control part applies a supplemental AC to said vane electrodes.

11. The mass analyzer according to claim 10, wherein the vane electrodes provided between adjacent rods of the plurality of rod electrodes constituting said ion trap have an arc-shaped dent and the vane electrodes are provided between adjacent rod electrodes of the plurality of rod electrodes by being divided into two parts in a center axis direction of said collisional dissociation part so that edges having the arc-shaped dent are directed toward the center axis of said collisional dissociation part.

12. The mass analyzer according to claim 4, wherein said control part replaces a mass spectrum of said precursor ions measured by said ion trap part with a mass spectrum of the precursor ions measured by said mass analyzing part stored in the list that was previously measured using a second set of operating conditions.

13. A mass analyzing method in a mass analyzer having an ion trap, a collisional dissociation part, a mass analyzing part, and a control part, wherein said ion trap switches an ion ejection operation to eject specific precursor ions in a direction of said collisional dissociation part and a standby operation in which ions are not ejected in the direction of said collisional dissociation part, said collisional dissociation part generates fragment ions by dissociation after collision of precursor ions introduced from said ion trap with a buffer gas, said mass analyzing part performs a mass analysis of the fragment ions introduced from said collisional dissociation part and generated by dissociation, and said control part changes the mass range of ions ejected from said ion trap by two or more scanning rates in each mass scanning time, and controls a set of voltages during a first period of a first scanning rate of said mass scanning time as ions are ejected, in which ions are introduced into the collisional dissociation part; and another set of voltages during a second period of a second scanning rate of said mass scanning time as ions are ejected, in which ions are not introduced into the collisional dissociation part.

14. The mass analyzing method according to claim 13, wherein said control part has a list in which measurement conditions for each ion are stored, and switches the ion ejection operation and the standby operation with reference to said list.

15. The mass analyzing method according to claim 13, wherein said control part has a list in which measurement conditions for each ion are stored, and sets a kinetic energy of ions introduced into said collisional dissociation part and an intensity of a DC electric field formed on a center axis of said collisional dissociation part depending on type of ions introduced from said ion trap with reference to said list.

16. The mass analyzer according to claim 1, wherein the first scanning rate with which ions are introduced into the collision dissociation part is lower than the second scanning rate with which ions are not introduced into the collisional dissociation part.

17. The mass analyzer according to claim 1, wherein there is an interval longer than 0.2 ms between successive first periods with the first scanning rate.

* * * * *